(12) United States Patent
Yu et al.

(10) Patent No.: US 10,747,293 B2
(45) Date of Patent: Aug. 18, 2020

(54) TIMING CONTROLLERS FOR DISPLAY DEVICES

(71) Applicant: HEWLETT-PACKARD DEVELOPMENT COMPANY, L.P., Houston, TX (US)

(72) Inventors: Cheng-Hua Yu, Taipei (CN); Hogan Yeh, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 5 days.

(21) Appl. No.: 16/075,624

(22) PCT Filed: Jan. 23, 2017

(86) PCT No.: PCT/US2017/014486
§ 371 (c)(1),
(2) Date: Aug. 4, 2018

(87) PCT Pub. No.: WO2018/136091
PCT Pub. Date: Jul. 26, 2018

(65) Prior Publication Data
US 2019/0041956 A1 Feb. 7, 2019

(51) Int. Cl.
*G06F 1/3218* (2019.01)
*G06F 1/3234* (2019.01)
*G06F 1/3231* (2019.01)
*G09G 3/36* (2006.01)
*G09G 5/393* (2006.01)
*G09G 5/00* (2006.01)

(52) U.S. Cl.
CPC .......... *G06F 1/3218* (2013.01); *G06F 1/3231* (2013.01); *G06F 1/3265* (2013.01); *G09G 3/3611* (2013.01); *G09G 5/393* (2013.01); *G09G 5/006* (2013.01); *G09G 2330/021* (2013.01); *G09G 2360/18* (2013.01)

(58) Field of Classification Search
None
See application file for complete search history.

(56) References Cited

U.S. PATENT DOCUMENTS

| 8,860,888 | B2 | 10/2014 | Kobayashi et al. |
| 9,239,596 | B2 | 1/2016 | Lu et al. |
| 2013/0083047 | A1* | 4/2013 | Shamarao ................ G09G 3/20 345/547 |

(Continued)

OTHER PUBLICATIONS

"QHD+ Panel Self-Refresh eDP TCON—Intel Architecture-Preliminary ANX2804 Product Brief", Analogix, Retrieved from Internet: http://www.analogix.com/cn/system/files/AA-004470-PB-2-ANX2804_OEM_Product_Brief 3.pdf, Aug. 2016, 2 pages.

*Primary Examiner* — Aneeta Yodichkas
(74) *Attorney, Agent, or Firm* — HPI Patent Department

(57) ABSTRACT

In one example, a timing controller is described, which may include a receiver to receive input data having an input signal from a source unit. The timing controller may include a data control unit to enable panel self-refresh (PSR) mode when the input signal is within a first voltage range and disable the PSR mode when the input signal is within a second voltage range. The first voltage range being different from the second voltage range. The timing controller may include a transmitter to transmit the input data to a display based on an output of the data control unit.

14 Claims, 7 Drawing Sheets

(56) References Cited

U.S. PATENT DOCUMENTS

| | | | |
|---|---|---|---|
| 2013/0235055 A1* | 9/2013 | Kim | G09G 5/006 345/545 |
| 2014/0025879 A1 | 1/2014 | Yuan et al. | |
| 2014/0267444 A1* | 9/2014 | Hwang | G09G 3/2025 345/690 |
| 2015/0206502 A1* | 7/2015 | Hwang | G09G 3/3618 345/213 |
| 2016/0189668 A1 | 6/2016 | Kang et al. | |
| 2016/0267881 A1* | 9/2016 | Tann | G09G 5/18 |

* cited by examiner

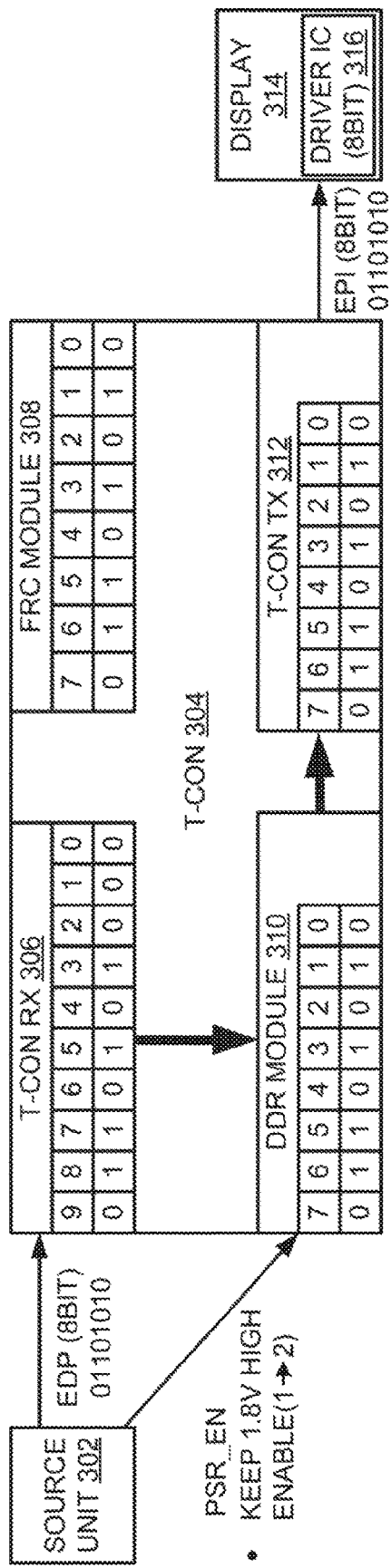
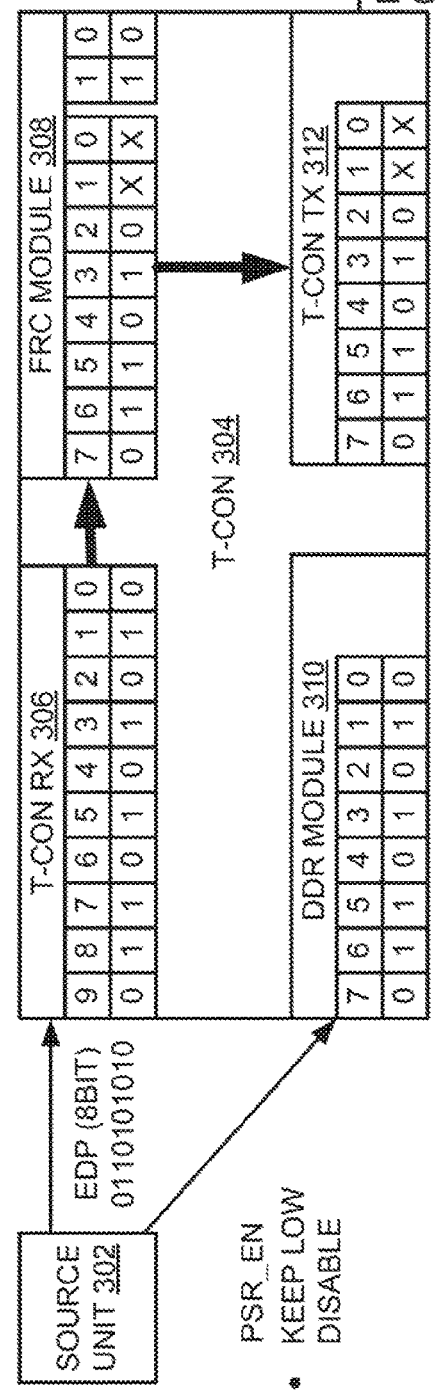
FIG. 3A
FIG. 3B

TIMING CONTROLLERS FOR DISPLAY DEVICES

BACKGROUND

Display devices may have a larger display area and a higher resolution. A high-resolution display device may receive an image signal from a host through a display drive integrated chip (IC) to display the image signal. When the display device receives a still image from the host, power consumption may occur in the memory access and at the interface of the host used to display the still image. Video Electronics Standard Association (VESA) has announced an embedded display port (eDP) standard. The eDP standard is an interface standard for portable devices equipped with a display such as a laptop computer, a tablet personal computer (PC), a notebook, and an all-in-one desktop PC. Particularly, the eDP includes a panel self-refresh (PSR) technology.

BRIEF DESCRIPTION OF THE DRAWINGS

Examples are described in the following detailed description and in reference to the drawings, in which:

FIG. 3A is a block diagram showing an example panel self-refresh (PSR) operation of the timing controller when an input signal is within a high voltage range;

FIG. 3B is a block diagram showing an example frame rate control (FRC) operation of the timing controller when the input signal is within a low voltage range;

DETAILED DESCRIPTION

Figure 1A:
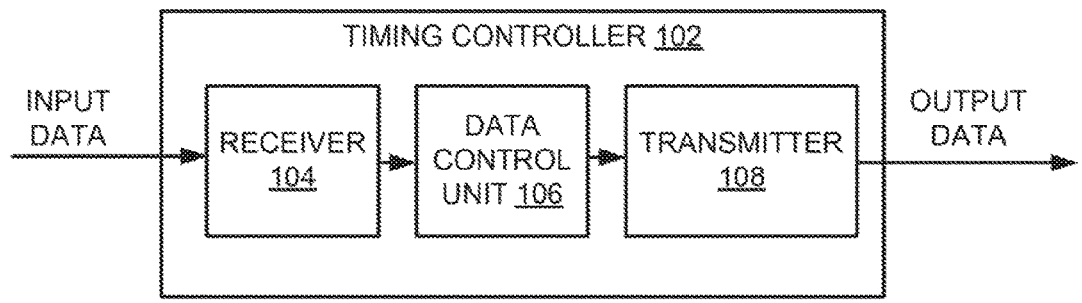
FIG. 1A is a block diagram of an example timing controller to receive input data and provide output data to a display.

A display device capable of a panel self-refresh (PSR) operation may include a source unit and a sink unit. The sink unit may include a timing controller ands a display unit. The source unit and the sink unit may communicate with each other via an eDP interface. For example, the display device may activate a PSR mode when the input is a still image data having no change in display, and deactivate the PSR mode in the case of video but not still images.

When the PSR mode is activated, image data is transmitted from the source unit to the timing controller and stored in a remote frame buffer (RFB) of the timing controller. Then, operating power of the source unit can be turned off, and the data stored in the RFB can be applied to the display unit, Until the RFB is updated with new image data, the operating power of the source unit may remain in the OFF state, and the display unit continues to display the data stored in the RFB. That is, when the PSR mode is activated, the display automatically remains the same by the data stored in the RFB even when the operating power of the source unit is in the OFF state. This leads to reduced power consumption end increased battery usage time without the user's recognition.

Further, when the PSR mode is deactivated, data to be transmitted from the source unit to the timing controller may be applied to the display unit without being stored in the RFB, and the operating power of the source unit continues to remain in the ON state. However, different individual configurations may be needed to separate the timing controller design to support either a lower color depth with the PSR made or a higher color depth without PSR mode.

Examples described herein may provide a timing controller including a receiver, a data control unit, and a transmitter. The receiver may receive input data having an input signal from a source unit, the data control unit may perform one of: a) enable PSR mode when the input signal is within a first voltage range, and b) disable the PSR mode when the input signal is within a second voltage range, the first voltage range being different from the second voltage range. The transmitter may transmit the input data to a display based on an output of the data control unit.

The data control unit may include a first control unit and a second control unit. In one example, the input data may be sent to the display through the first control unit to enable the PSR mode for saving power consumption of the source unit when the input signal is within the first voltage range (e.g., high voltage range), In another example, the input data may be sent to the display through the second control unit to disable the PSR mode and control a frame rate of the input data to provide the input data with a higher color depth when the input signal is within the second voltage range (e.g., low voltage range). For example, the input signal within the first voltage range or within the second voltage range may be generated based on whether a graphics processing unit (GPU) of the source unit outputs n-bit data or m-bit data, respectively, where m>n.

The timing controller described herein may support 8/10-bit data input and selective PSR enable or disable (i.e., by applying a high voltage signal or low voltage signal to the same I/O pin of the timing controller) to fulfil different system features. For example, the timing controller can support the PSR mode to save the battery life of the display device and with the same configuration can support the higher color depth data from the GPU.

Turning now to the figures, FIG. 1A is a block diagram 100 of an example timing controller 102 to receive input data and provide output data to a display. Timing controller 102 may include a receiver 104 to receive input data having an input signal from a source unit, for instance, via an eDP interface. Example source unit may include, but are not limited to, any device capable of producing or transmitting video content, such as video, image data, animation, text, audio (sound, music, and the like), interactive content, or a combination thereof.

In one example, timing controller 102 may include a data control unit 106 to enable a PSR mode when the input signal is within a first voltage range. In another example, data control unit 106 may disable the PSR mode when the input signal is within a second voltage range. The first voltage range being different from the second voltage range. For example, the first voltage range may be about 1.6 to 1.9 volts, and the second voltage range may be about −0.1 to 0.2 volts.

Figure 1B:
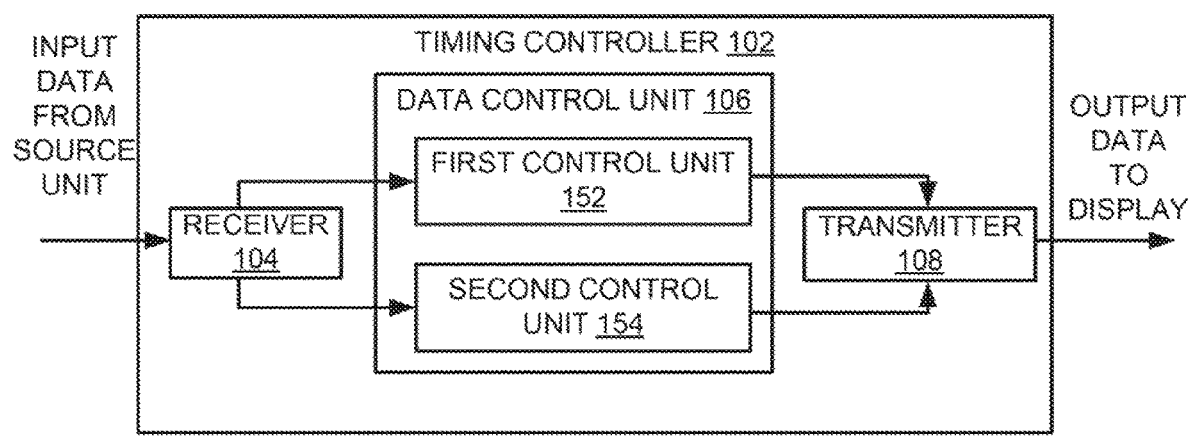
FIGS. 1B and 1C are block diagrams of the example timing controller of FIG. 1A, depicting additional components.

Further, timing controller 102 may include a transmitter 108 to transmit the input data to the display, based on an output of data control unit 106. As shown in FIG. 1B, data control unit 106 may include a first control unit 152 and a second control unit 154. As shown in FIG. 1B, the input data may be sent to the display through first control unit 152 to enable the PSR mode for saving power consumption of the source unit when the input signal is within the first voltage range. In another example, the input data may be sent to the display through second control unit 154 to disable the PSR mode and control a frame rate of the input data to provide the input data with a higher color depth when the input signal is within the second voltage range.

Figure 1C:
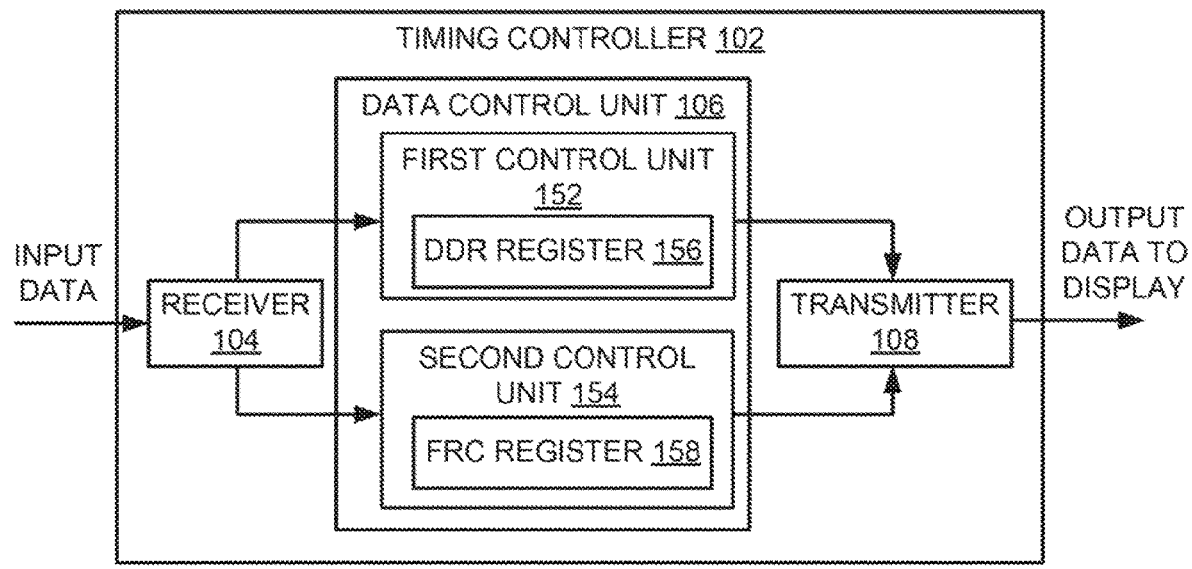

As shown in FIG. 1C, first control unit 152 may include a double data rate (DDR) register 156 or DDR module to store frames used in the PSR mode. That is, when the PSR mode is activated, the display automatically remains the same by the data stored in the DDR register 156 even when the operating power of the source unit is in the OFF state. During the PSR mode, timing controller 102 may drive a display panel of the display with the frames stored in DDR register 156 until timing controller 102 receives the input signal within the second voltage range.

Second control unit 154 may include a frame rate control (FRC) register 158 or FRC module to process the input data by converting m-bit data to n-bit data, where m>n. For example, consider m-bit data as 10-bit data and n-bit data as 8-bit data. In this case, the 10-bit data may be received from the source unit, the received 10-bit data may be converted to the 8-bit data using the FRC register 158, and the converted 8-bit data is outputted to provide the input data with a higher color depth (i.e., display high-quality images at a lower gradation resolution than the input data supplied from the source unit). DDR register 156 and FRC register 158 may hold instructions, storage addresses, and/or any kind of data (such as a bit sequence or individual characters) to perform the examples described herein.

Figure 2A:
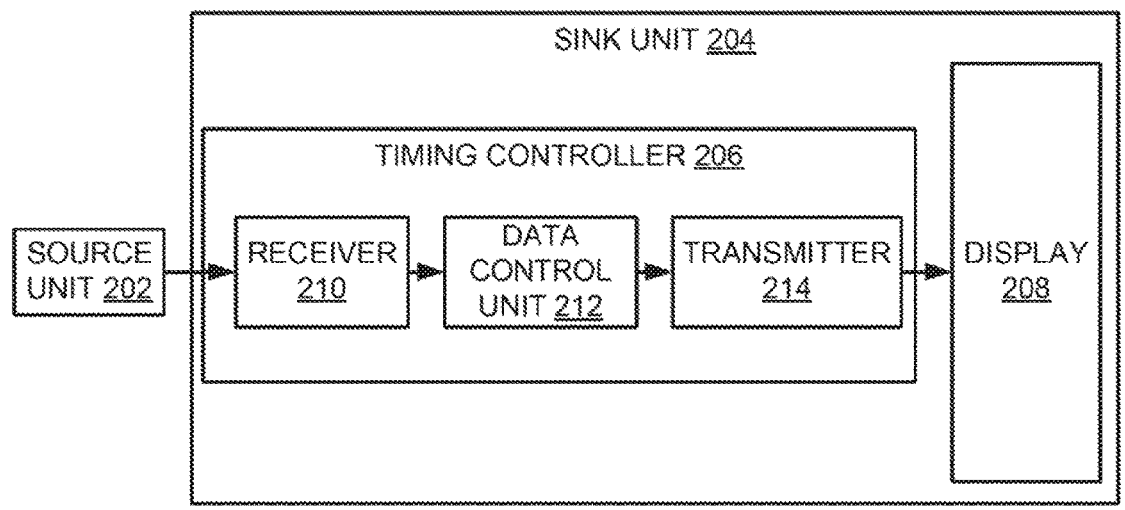
FIG. 2A is a block diagram of an example system Including a source and a sink unit.

FIG. 2A is a block diagram of an example system 200 including a source unit 202 and a sink unit 204 operatively connected with source unit 202. Example system 200 may be a laptop computing device, desktop computing device, tablet computing device, media player, accessory device, cellular phone, television, or any other electronic device incorporating an (organic light emitting diode) OLED display, (light emitting diode) LED display panel, and/or liquid crystal display (LCD). System 200 may include any device having graphics hardware along with display eDP feature enabled. Source unit 202 may indicate a system, which includes a transmitter 264 (e.g., an eDP transmitter). Example source unit 202 may include, but are not limited to, any device capable of producing or transmitting input data (e.g., multimedia content). The multimedia content can be interpreted broadly to encompass any data configured in any data format. Accordingly, such multimedia content can include, but is not limited to, video, image data, animation, text, audio (sound, music, and the like), or interactive content, or a combination thereof. Source unit 202 may be a device that capture, generate, or transmit the input data.

Sink unit 204 may indicate a panel portion, which includes timing controller 206 and display 208. Source unit 202 may transmit the input data to timing controller 206 included in sink unit 204 through the transmitter 264. Timing controller 206 may include a receiver 210 (e.g., eDP receiver), a data control unit 212, and a transmitter 214 (e.g., including a remote frame buffer) to enable/disable the PSR mode. Source it 202 and sink unit 204 may communicate with each other via an eDP interface (e.g., 266).

During operation, receiver 210 may receive input data having an input signal from source unit 202. In one example, the it signal from source unit 202 may be applied to the eDP interface (e.g., I/O pin) of timing controller 206. Data control unit 212 may generate a control signal to activate a PSR mode to reduce power consumption of system 200 when the input signal is within a high voltage range. Further, data control unit 212 may generate a control signal to deactivate the PSR mode and control a frame rate of the input data when the input signal is within a low voltage range. Transmitter 214 may transmit the input data to display 208 based on the control signal.

Figure 2B:
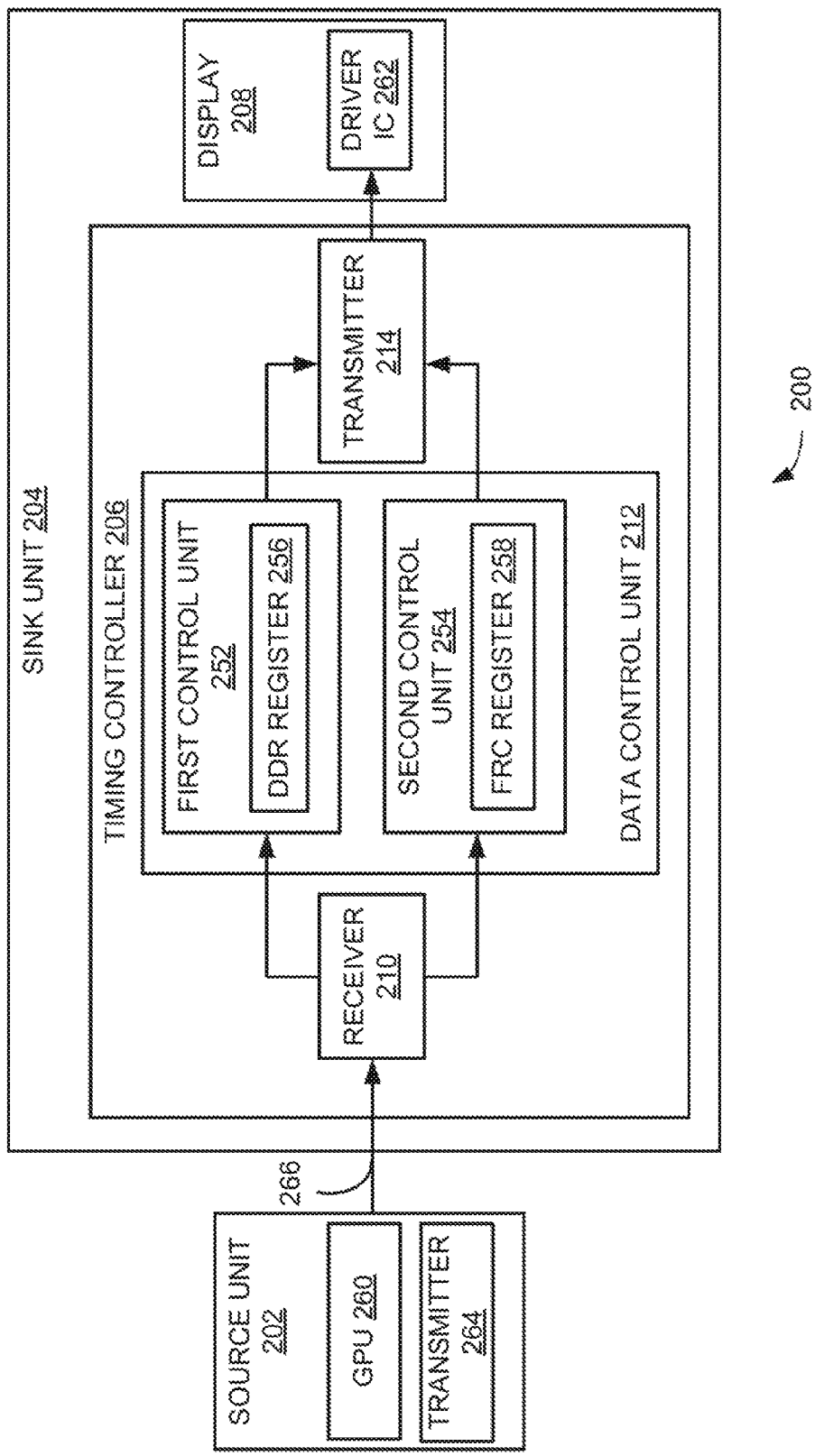
FIG. 2B is a block diagram of the example system of FIG. 2A, depicting additional components of the source unit and the sink unit.

As shown in FIG. 2B, source unit 202 may include a GPU 260 that provides the input data and the input signal to timing controller 206. GPU 260 may generate the input data which may be communicated to timing controller 206. Source unit 202 and sink unit 204 may communicate with each other via eDP interface 266. For example, GPU 260 may generate video data along with the input signal during an operation of system 200. Further, display 208 may include a driver integrated circuit (IC) 262. Driver IC 262 may provide an interface function between timing controller 206 and display 208.

Further as shown in FIG. 2, data control unit 212 may include a first control unit 252 and a second control unit 254. During operation, the input data may be sent to display 208 through first control unit 252 to activate the PSR mode when the input signal within the high voltage range is received from source unit 202. Further, the input data may be sent to display 208 through second control unit 254 to deactivate the PSR mode and control the frame rate of the input data to provide the input data with a higher color depth when the input signal within the low voltage range is received from source unit 202. For example, the high voltage range may be about 1.6 to 1.9 volts and the low voltage range may be about −0.1 to 0.2 volts. Particularly, high voltage range may be about 1.8 volts and low voltage range may be about 0 volts or ground voltage.

In one example, source unit 202 may generate the input signal within the high voltage range when GPU 260 outputs n-bit data. In another example, source unit 202 may generate the low voltage range when GPU 260 outputs m-bit data, where m>n. For example, m-bit data may be 10-bit data and n-bit data may be 8-bit data.

Further as shown in FIG. 2B, first control unit 252 may include a DDR register 256 to enable the PSR mode by storing frames used during the PSR mode for reducing the power consumption of system 200. Example DDR register 256 may include a remote frame buffer (RFB). The stored frames may be supplied to driver IC 262 of display 208 until timing controller 206 receives an input signal within the low voltage range. Thus, enabling and disabling the PSR mode can be controlled by source unit 202 using the input signal within the high voltage range or the low voltage range.

Second control unit 254 may include a FRC register 258 to process the input data by converting m-bit data to n-bit data for outputting the input data with the higher color depth, where m>n. For example, second control unit 254 may perform frame rate control on the supplied 10-bit data to produce 8-bit data suitable for displaying by display 208, which may be then supplied to driver IC 262 of display 208.

In one example, the components of timing controllers 102 and 206 of FIGS. 1 and 2, respectively, may be implemented in hardware, machine-readable instructions or a combination thereof. In one example, the components (e.g., first control units 152 and 252 and second control units 154 and 254) of timing controllers 102 and 206 may be implemented as engines or modules comprising any combination of hardware and programming to implement the functionalities described herein. Timing controllers 102 and 206 may include computer-readable storage medium comprising (e.g., encoded with) instructions executable by a processor to implement functionalities described herein in relation to FIGS. 1-2. In some examples, the functionalities described herein, in relation to instructions to implement functions of components of timing controllers 102 and 206 and any additional instructions described herein in relation to the storage medium, may be implemented as engines or modules comprising any combination of hardware and programming to implement the functionalities of the modules or engines described herein.

The functions of components of timing controllers 102 and 206 may also be implemented by respective processors. The processors may be internal or external to the timing controller (e.g., 102 or 206). For example, the processor may be included in an associated electronic device such as a laptop computer, a desktop computer, server, tablet computing device, smart phone, wearable accessory, digital media player, and so on. The processor can be operationally coupled to the timing controller (e.g., 102 or 208). In examples described herein, the processor may include, for example, one processor or multiple processors included in a single device or distributed across multiple devices.

FIG. 3A is a block diagram 300A showing an example PSR operation of a timing controller (T-con) 304 when an input signal is within a high voltage range, As shown in FIG. 3A, timing controller 304 may include a receiver (T-con RX) 306, a FRC module 308, a DDR module 310, and a transmitter (T-con TX) 312. Particularly, FIG. 3A depicts timing controller 304 with two different groups of registry (e.g., FRC module 308 and DDR module 310), which can be identified by PSR_EN pin state to select an operation mode to route the input data. In one example, the input data can be routed through DDR module 310 to enable PSR mode or through FRC module 308 to disable PSR mode and output the input data with a higher color depth.

As shown in FIG. 3A, the input data (e.g., 8-bit data) along with the input signal within the high voltage range leg., 1.8 volts) may be transmitted from a source unit 302 to receiver 306. Upon receiving the input signal within the high voltage range, the input data can be routed through DDR module 310 to enable the PSR mode for reducing the power consumption, for instance, of source unit 302. In this case, DDR module 310 may store the input data. Then, the operating power of source unit 302 can be turned off, and the data stored in DDR module 310 can be supplied to display 314 via transmitter 312 and a driver IC 316.

FIG. 3B is a block diagram 3008 showing an example FRC operation of timing controller 304 when the input signal is within a low voltage range. As shown in FIG. 38, input data (e.g., 10-bit data) along with the input signal within the low voltage range (e.g., 0 volts) may be transmitted from source unit 302 to receiver 306. Upon receiving the input signal within the low voltage range, the input data can be routed through FRC module 308 to disable the PSR mode and control the frame rate of the input data to provide the input data with a higher color depth. In this case, FRC module 308 may perform frame rate control on the supplied 10-bit data to produce 8-bit data suitable for image display by display 314, and the converted 8-bit data may be supplied to display 314 via transmitter 312 and driver IC 316.

For example, FRC module 308 may separate the 10-bit data inputted from source unit 302 into the 8 most significant bits and the 2 least significant bits, and then compares the 2 least significant bits with a stored dummy pattern to calculate a one bit dithering value. The one bit dithering value may be then added to the 8 most significant bits using a carry signal to output 8-bit data. Thus, timing controller 304 can support PSR mode to save system battery life and with same configuration control the frame rate to support higher color depth data from the GPU.

Figure 4:
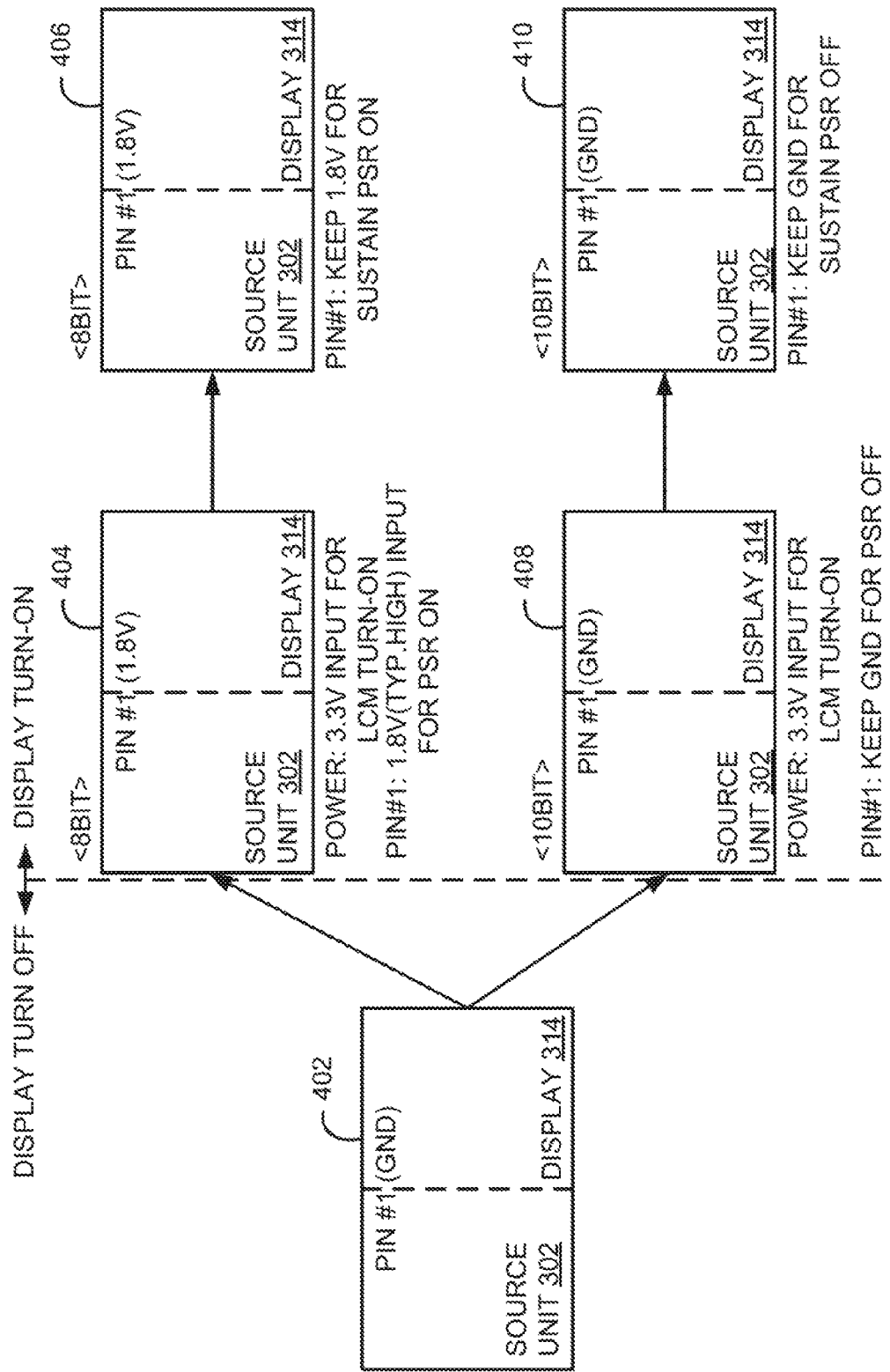
FIG. 4 is a schematic view she an example operation of the timing controller to enable/disable the PSR mode based on an input signal (e.g., input voltage signal) applied to an input/output (I/O) pin of the timing controller.

FIG. 4 is a schematic view 400 showing an example operation of the timing controller to enable/disable a PSR mode based an input signal (e.g., an input voltage signal) applied to an input/output (I/O) pin (i.e., pin #1) of the timing controller. FIG. 4 may indicate the timing controller having one I/O pin featured as PSR_EN to receive the high or low voltage signal from source unit 302 (e.g., system mainboard) to determine an operation mode inside of the timing controller.

At 402, the I/O pin #1 may be at ground voltage level. In one example, at 404, an input power (e.g., 3.3 volts) may be supplied to turn on display 314 (e.g., liquid crystal monitor (LCM)). Further, when an input signal within a high voltage range is received at pin #1, a first operation mode may be selected in the timing controller to enable the PSR mode. At 406, the input signal within the high voltage range may be maintained at pin #1 to sustain the PSR on state.

Initially, the I/O pin #1 may be at ground voltage level (e.g., at 402). In another example, at 408, an input power (e.g., 3.3 volts) is supplied to turn on display 314 (e.g., liquid crystal monitor (LCM)). Further, when the input signal within a low voltage range is received/maintained at pin #1, a second operation mode may be selected in the timing controller to disable the PSR mode. At 410, the, input signal within the low voltage range may be maintained at pin #1 to sustain the PSR off state.

Figure 5:
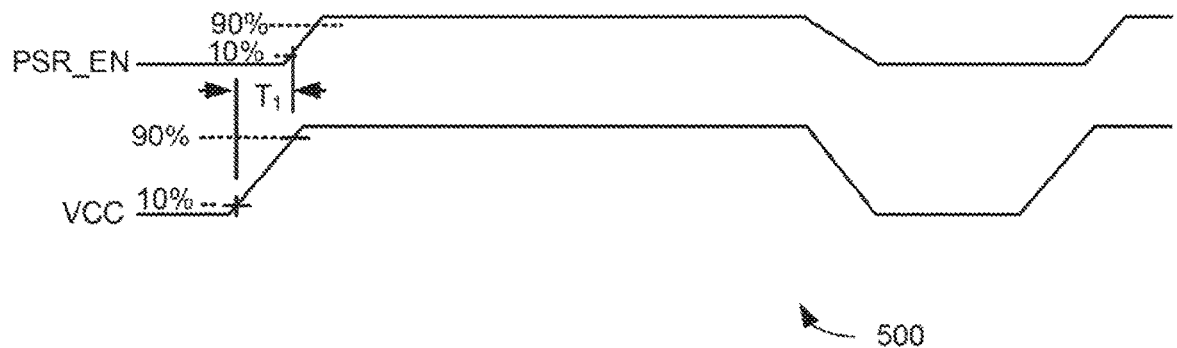
FIG. 5 is a timing diagram illustrating an example power sequence of the I/O pin of the timing controller.

FIG. 5 is a timing diagram 500 illustrating an example power sequence of the I/O pin of the timing controller. As shown in FIG. 5, a T1 timing may be identified for the PSR enable (PSR_EN) signal while complying with the standard timing requirements. As shown in FIG. 5, the PSR_EN signal may be provided with a delay of T1 with respect to power supply (VCC) to enable the PSR mode. T1 may be in a range of 0.5 to 10 milliseconds.

Figure 6:
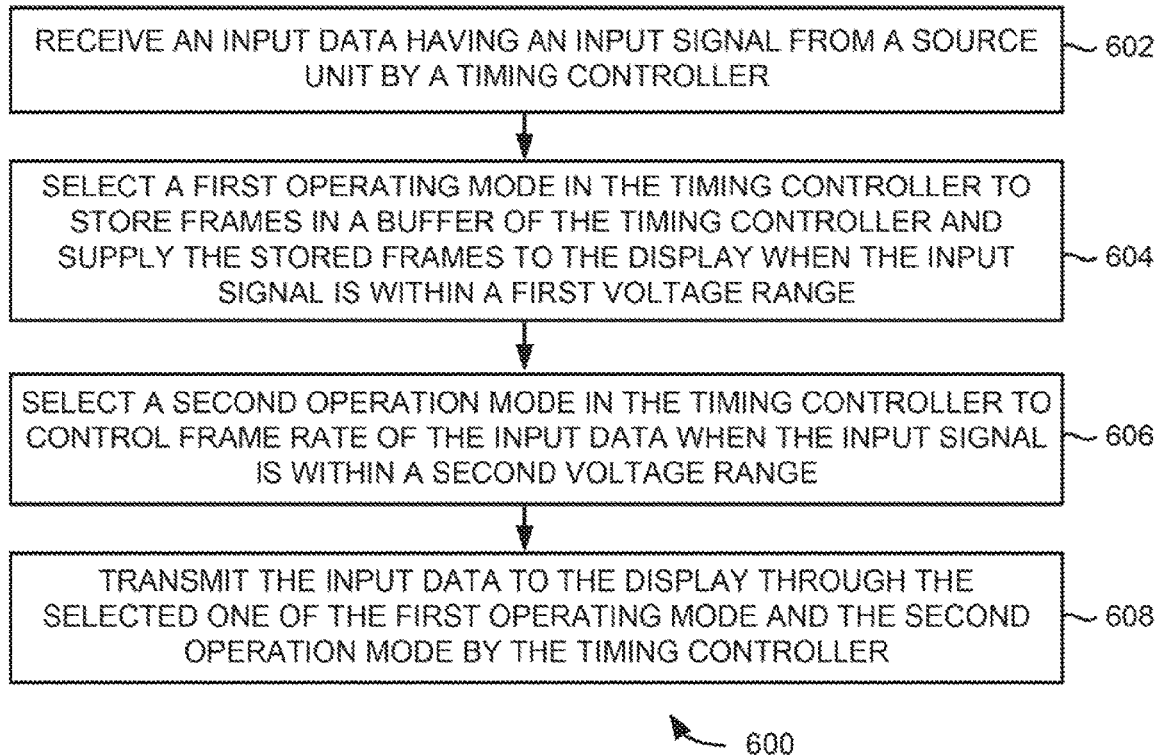
FIG. 6 is an example flow chart of a method for controlling an operation of a display.

FIG. 6 is an example flow chart 600 of a method for controlling an operation of a display. It should be understood that the process depicted in FIG. 6 represents generalized illustrations, and that other processes may be added or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate program, or use a combination of hardware and program to perform the illustrated processes.

At 602, input data having an input signal may be received from a source unit, by a timing controller. At 604, a first operating mode may be selected in the timing controller to store frames in a buffer of the timing controller and supply the stored frames to the display when the input signal is within a first voltage range. The input signal within the first voltage range may be generated by the source unit when the input data is n-bit data (e.g., 8-bit data). The first voltage range may be about 1.6 to 1.9 volts.

In one example, the timing controller may include a DDR register. The received input data may be transmitted to the display through the DDR register in the first operating mode. The DDR register may store frames of the input data in the buffer of the timing controller and supply the stored frames to the display for reducing power consumption of the source unit. In one example, a PSR mode may be enabled in the first operating mode. During the PSR mode, timing controller may drive the display with the frames stored in the DDR register until timing controller receives the input signal within the second voltage range.

At 606, a second operation mode may be selected in the timing controller to control a frame rate of the input data when the input signal is within a second voltage range. In one example, the second voltage range may be less than the first voltage range. The input signal within the second voltage range may be generated by the source unit when the input data is m-bit data (e.g., 10-bit data), where m>n. The second voltage range may be about −0.1 to 0.2 volts.

Figure 7:
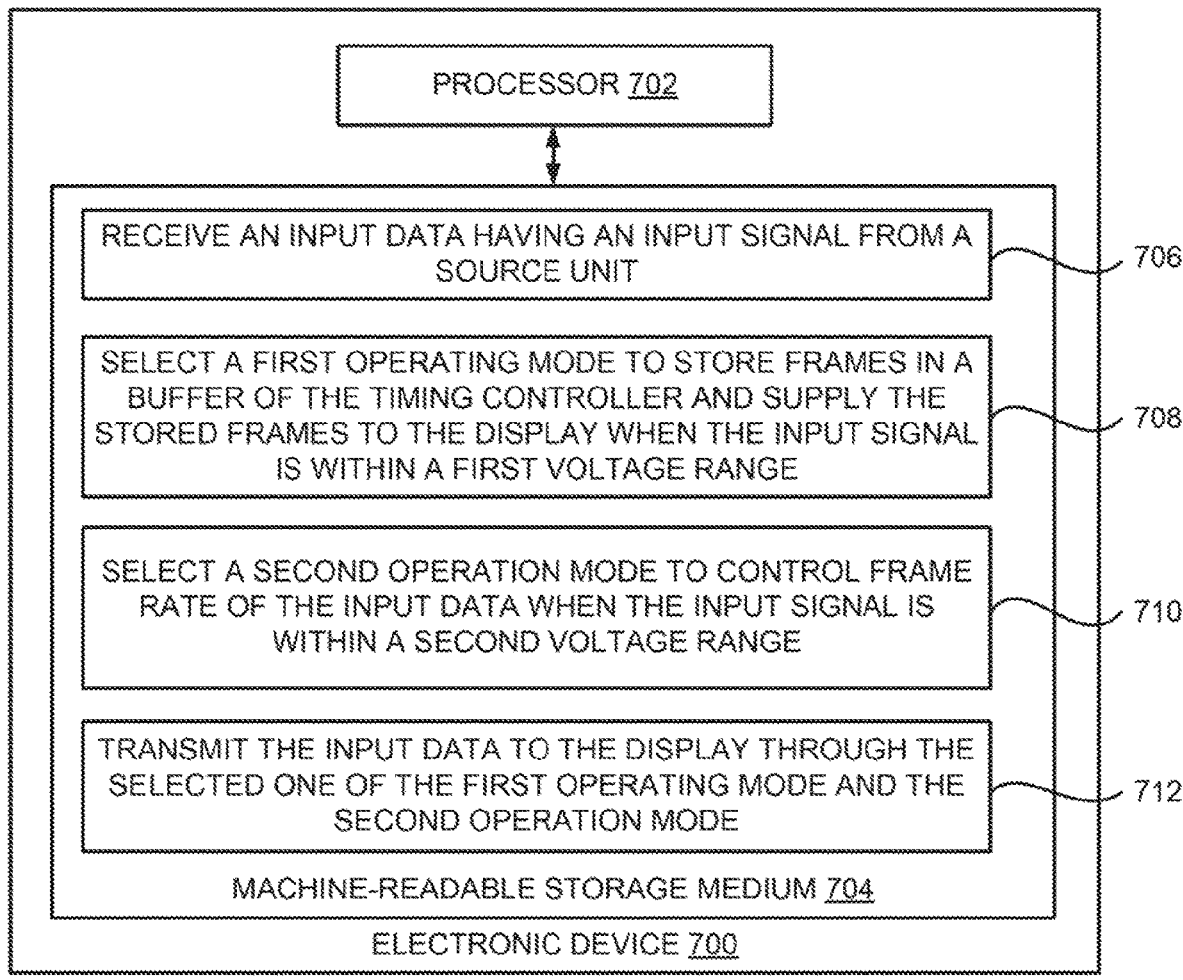
FIG. 7 illustrates a block diagram of an example electronic device to select an operating mode of a timing controller based on an input signal.

In one example, the timing controller may include an FRC register. In one example, the PSR mode may be disabled in the second operating mode. The received input data may be transmitted to the display through the FRC register to control the frame rate of the input data to provide the input data with a higher color depth in the second operating mode. For example, the frame rate of the input data may be controlled by converting m-bit data to n-bit data, where m>n. At 608, the input data may be transmitted to the display through the selected one of he first operating mode and the second operation mode by the timing controller, FIG. 7 illustrates a block diagram of an example electronic device 700 to select an operating mode of a timing controller based on an input voltage level. Electronic device 700 may include a processor 702 and a machine-readable storage medium 704 communicatively coupled through a system bus. Processor 702 may be any type of central processing unit (CPU), microprocessor, or processing logic that interprets and executes machine-readable instructions stored in machine-readable storage medium 704. Machine-readable storage medium 704 may be a random-access memory (RAM) or another type of dynamic storage device that may store information and machine-readable instructions that may be executed by processor 702. For example, machine-readable storage medium 704 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 704 may be a non-transitory machine-readable medium. In an example, machine-readable storage medium 704 may be remote but accessible to electronic device 700.

Machine-readable storage medium 704 may store instructions 706-712. In an example, instructions 706-712 may be executed by processor 702 to provide a mechanism for performing input operations on a display of electronic device 700 using input pen gestures. Instructions 706 may be executed by processor 702 to receive input data having an input signal from a source unit by a timing controller. Instructions 708 may be executed by processor 702 to select a first operating mode in the timing controller to store frames in a buffer of the timing controller and supply the stored frames to the display when the input signal is within a first voltage range. Instructions 710 may be executed by processor 702 to select a second operation mode in the timing controller to control a frame rate of the input data when the input signal is within a second voltage range. The second voltage range may be less than the first voltage range. Instructions 712 may be executed by processor 702 to transmit the input data to the display through the selected one of the first operating mode and the second operation mode by the timing controller.

It may be noted that the above-described examples of the present solution are for the purpose of illustration only. Although the solution has been, described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing, examples. it is understood, however, that other forms, details, and examples can be made without departing from the spirit and scope of the present subject matter that is defined in the following claims.

What is claimed is:

1. A timing controller, comprising:
a receiver to receive input data having an input signal from a source unit;
a data control unit to:
enable panel self-refresh (PSR) mode via a first control unit when the input signal is within a first voltage range to reduce power consumption by the source unit operating in a first, lower color depth mode; and
disable the PSR mode when the input signal is within a second voltage range and transmit the input data via a second control unit with the source unit operating in a second, higher color depth mode, wherein the first voltage range is different from the second voltage range; and
a transmitter to transmit the input data to a display based on an output of the data control unit.

2. The timing controller of claim 1, wherein the first control unit comprises a double data rate (DDR) register to store frames used in the PSR mode to enable the PSR mode for saving power consumption of the source unit when the input signal is within the first voltage range.

3. The timing controller of claim 1, wherein the input data is sent to the display through the second control unit to disable the PSR mode and further control a frame rate of the input data when the input signal is within the second voltage range.

4. The timing controller of claim 1, wherein the second control unit comprises a frame rate control (FRC) register to process the input data by converting m-bit data to n-bit data, and wherein m>n.

5. The timing controller of claim 1, wherein the first voltage range is about 1.6 to 1.9 volts and the second voltage range is about −0.1 to 0.2 volts.

6. A system comprising:
a source unit; and
a sink unit operatively connected with the source unit, wherein the sink unit comprises a timing controller and a display, wherein the timing controller comprises:
a receiver to receive input data having an input signal from the source unit;
a data control unit to generate a control signal to:
activate panel self-refresh (PSR) mode to reduce power consumption of the system when the input signal is within a high voltage range when the source unit is in a first, lower color depth mode;
deactivate the PSR mode and control a frame rate of the input data when the input signal is within a low voltage range when the source unit is in a second, higher color depth mode; and
a transmitter to transmit the input data to the display based on the control signal.

7. The system of claim 6, wherein the sink unit is operatively connected with the source unit via an embedded display port (eDP) interface, and wherein the input signal from the source unit is applied to the eDP interface.

8. The system of claim 6, wherein the data control unit comprises a first control unit and a second control unit, wherein the input data is sent to the display through the first control unit to activate the PSR mode when the input signal within the high voltage range is received from the source unit, and wherein the input data is sent to the display through the second control unit to deactivate the PSR mode and control the frame rate of the input data to provide the input data with a higher color depth in a second, higher color depth mode when the input signal within the low voltage range is received from the source unit.

9. The system of claim 8, wherein the first control unit comprises a double data rate (DDR) register to store frames used in the PSR mode for reducing the power consumption of the system, and wherein the second control unit comprises a frame rate control (FRC) register to process the input data by converting m-bit data to n-bit data for providing the input data with the higher color depth in a second, higher color depth mode, and wherein m>n.

10. The system of claim 6, wherein the source unit comprises a graphics processing unit (GPU), wherein the source unit is to:
generate the input signal within the high voltage range when the GPU outputs n-bit data; and
generate the input signal within the low voltage range when the GPU outputs m-bit data, wherein m>n, wherein the high voltage range is about 1.6 to 1.9 volts and the low voltage range is about −0.1 to 0.2 volts.

11. A method for controlling an operation of a display comprising:
receiving input data having an input signal from a source unit by a timing controller;
selecting a first operating mode in the timing controller to store frames in a buffer of the timing controller and supply the stored frames to the display when the input signal is within a first voltage range that reduces power consumption of the source unit with the source unit operating in a first, lower color depth mode;
selecting a second operation mode in the timing controller to control a frame rate of the input data when the input signal is within a second voltage range with the source unit operating in a second, higher color depth mode, wherein the second voltage range is less than the first voltage range; and
transmitting the input data to the display through the selected one of the first operating mode and the second operation mode by the timing controller.

12. The method of claim 11, wherein the timing controller comprises a double data rate (DDR) register, wherein the received input data is transmitted to the display through the DDR register in the first operating mode, and wherein the DDR register is to store frames of the input data in the buffer of the timing controller and supply the stored frames to the display.

13. The method of claim 11, wherein the timing controller comprises a frame rate control (FRC) register, wherein the received input data is transmitted to the display through the FRC register to control the frame rate of the input data to provide the input data with a higher color depth in the second operating mode with the source unit operating in the second, higher color depth mode, wherein the frame rate of the input data is controlled by converting m-bit data to n-bit data, and wherein m>n.

14. The method of claim 11, wherein the input signal within the first voltage range is generated by the source unit when the input data is n-bit data, wherein the input signal within the second voltage range is generated by the source unit when the input data is m-bit data, wherein m>n.

\* \* \* \* \*